United States Patent
Perrot et al.

(10) Patent No.: US 7,764,639 B2
(45) Date of Patent: Jul. 27, 2010

(54) METHOD AND DEVICE FOR CONNECTION OF A DEVICE TO A WIRELESS NETWORK

(75) Inventors: Sébastien Perrot, Rennes (FR); Ludovic Jeanne, Rennes (FR); Gilles Straub, Acigné (FR)

(73) Assignee: Thomson Licensing, Boulogne Billancourt (FR)

( * ) Notice: Subject to any disclaimer, the term of this patent is extended or adjusted under 35 U.S.C. 154(b) by 1153 days.

(21) Appl. No.: 10/660,183

(22) Filed: Sep. 11, 2003

(65) Prior Publication Data

US 2004/0125744 A1   Jul. 1, 2004

(30) Foreign Application Priority Data

Sep. 12, 2002   (EP)   ................................. 02292228

(51) Int. Cl.
*H04W 4/00* (2009.01)
*G06F 15/16* (2006.01)

(52) U.S. Cl. ................... 370/328; 370/401; 709/249
(58) Field of Classification Search ............ 370/328, 370/338, 400, 401, 349; 709/223, 249
See application file for complete search history.

(56) References Cited

U.S. PATENT DOCUMENTS

| | | | | |
|---|---|---|---|---|
| 5,598,407 A | * | 1/1997 | Bud et al. | 370/330 |
| 5,898,679 A | * | 4/1999 | Brederveld et al. | 370/315 |
| 7,167,470 B2 | * | 1/2007 | Bailey et al. | 370/352 |
| 2003/0051170 A1 | * | 3/2003 | Spearman | 713/201 |
| 2003/0112767 A1 | * | 6/2003 | Meier | 370/256 |
| 2003/0120763 A1 | * | 6/2003 | Volpano | 709/223 |
| 2003/0235170 A1 | * | 12/2003 | Trainin | 370/338 |
| 2005/0157732 A1 | * | 7/2005 | Joy et al. | 370/401 |

FOREIGN PATENT DOCUMENTS

| | | |
|---|---|---|
| EP | 0828398 A | 3/1998 |
| WO | WO0018066 A | 3/2000 |
| WO | WO0208857 A | 1/2002 |
| WO | WO0209451 A | 1/2002 |

\* cited by examiner

*Primary Examiner*—Pankaj Kumar
*Assistant Examiner*—Saba Tsegaye
(74) *Attorney, Agent, or Firm*—Robert D. Shedd; Paul P. Kiel

(57) ABSTRACT

A method for connecting a device to a wireless network; at the level of a bridge device, configure to interface with the wireless network that maintains single management information. The bridge device separately registers, with respective MAC addresses, the device and itself as wireless devices on the wireless network.

15 Claims, 3 Drawing Sheets

METHOD AND DEVICE FOR CONNECTION OF A DEVICE TO A WIRELESS NETWORK

BACKGROUND OF THE INVENTION

The invention concerns a method and a first device for connecting a second device to a network. It is in particular applicable in the case of networks requiring registration of devices for determination of a medium access control address, which is the case for example for IEEE 802.11 type networks.

FIG. 1 is a diagram of a wireless sub-network 11, conforming for example to the IEEE 802.11 specification, connected to a wired medium sub-network 2, conforming for example to the IEEE 802.3 ('Ethernet') specification. The wireless sub-network comprises a number of stations (13 to 16), one of which (16) has the function of access point ('AP'). The access point provides access to the distributed system service to the other stations, which have to associate with the access point. The access point of FIG. 1 also comprises a portal from the wireless sub-network to a distributed medium (not illustrated) and a portal from the distributed medium to the wired sub-network 12. This allows stations on the wireless sub-network to exchange data frames with the devices 17 to 19. Note that this is just one possible implementation.

A station that is not an access point is not allowed to host a portal for connection to another sub-network. If a device, such as a personal computer, is connected to a station e.g. via an Ethernet connection, this device will not be recognized as such on the wireless network. One possible solution would be to have the device control the configuration and management of the station to a point at which there is, virtually, a device with station functionality. For instance, specific software could be used to control the station from the device, over their link, but this would require specific software and would make connecting several devices to the same station more difficult.

BRIEF SUMMARY OF THE INVENTION

An object of the invention is a method for connecting a device to a wireless network; characterized, at the level of a bridge device adapted to interface with the wireless network, by the steps of:
  detecting a connection between the device and the bridge device;
  determining an address for the device and for the bridge device;
  have the bridge device separately register, with the respective addresses, the device and itself as wireless devices on the wireless network.

According to an embodiment, the addresses are the unique MAC addresses of the device, generally fixed during manufacturing.

According to an embodiment, the method comprises the step of having the bridge device monitor traffic on the wireless network for the device.

According to an embodiment, the method further comprises the step of programming packet filters for packets having as destination address the address of the device, and upon detection of such a packet, acknowledging receipt of said packet in place of the device.

According to an embodiment, the method also comprises at least one of the following steps:
  forwarding all multicast packets detected on the wireless network from the bridge device to the connected device;
  forwarding all broadcast packets detected on the wireless network from the bridge device to the connected device;
  forwarding unicast packets on the wireless network having as destination address the address of the connected device to that device.

According to an embodiment, the connection between the device and the bridge device is an Ethernet connection, and wherein the step of detecting the connection comprises monitoring packets on the Ethernet connection for detecting a previously unknown source address of an Ethernet device.

According to an embodiment, the wireless network is of the IEEE 802.11 type, further comprising the step of maintaining a single management information base for both the bridge device and the connected device.

Another object of the invention is a bridge device adapted for communication on a wireless network and for connection of a first device not having wireless communication capability, said bridge device comprising:
  means for determining an address of the first device and of the bridge device;
  means for carrying out two separate device registrations on the wireless network, one for the bridge device, and one for the first device, using respective addresses.

BRIEF DESCRIPTION OF THE SEVERAL VIEWS OF THE DRAWINGS

Other characteristics of the invention appear in the description of a non-restrictive embodiment of the invention. This embodiment is described with the help of the following figures.

DETAILED DESCRIPTION OF AN EMBODIMENT

Figure 1:
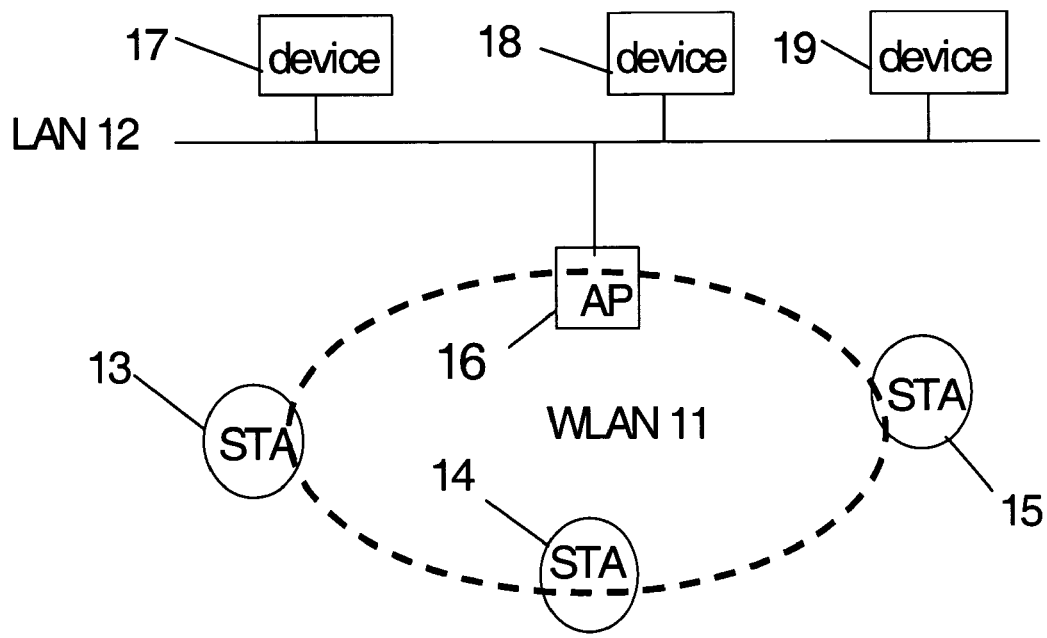
FIG. 1—already described—is a simplified diagram of a prior art network.
Figure 2:
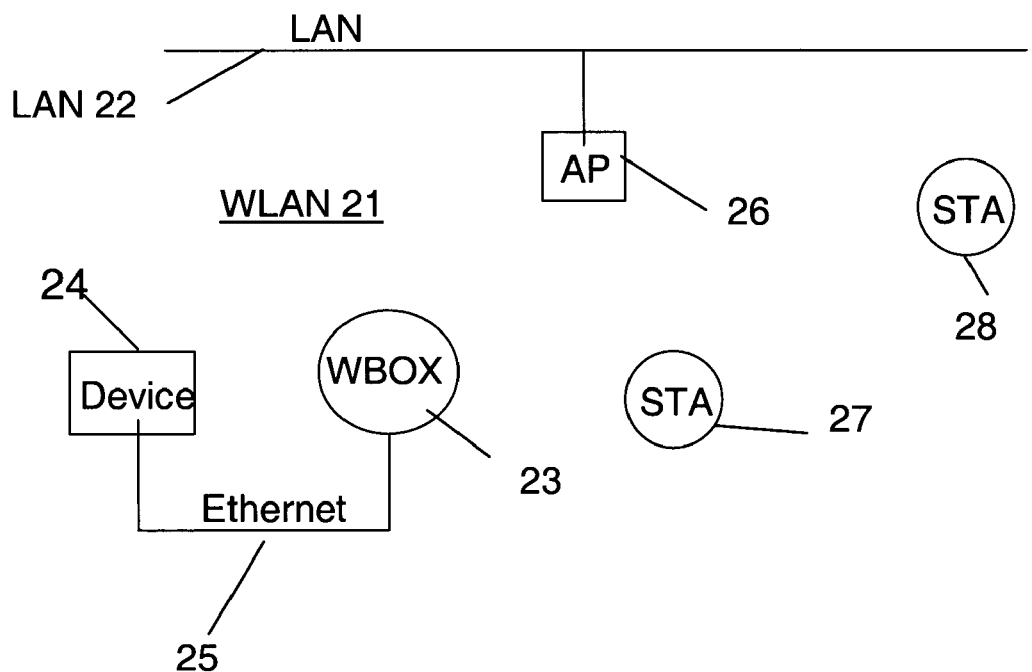
FIG. 2 is a simplified diagram of a network comprising a device according to the present embodiment.

The network of the present embodiment, as illustrated by FIG. 2, comprises a wireless sub-network 21 conforming to IEEE 802.11 and a wired sub-network 22 conforming to IEEE 802.3 (Ethernet) connected through an access point 26. The wireless sub-network comprises, in addition to the access point 26, three stations 23, 27 and 28. The station 23 will also be referred to as 'wireless box' or 'wbox,' designating its specific function for connecting other devices, in this case device 24 (e.g., a personal computer or domestic equipment such as audio/video receiver) to the wireless sub-network.

According to the present embodiment, the connection between the device 24 and the wireless box 23 is an Ethernet link. Note that this connection could be different, and based for example on USB, or another IEEE 802.x standard than Ethernet.

The device 24 and the wireless box 23 both possess independent TCP/IP/HTTP protocol stacks. The advantage of having an independent protocol stack at the level of the wireless box is that any device connected to the wireless box may control this wireless box using a standard Internet browser. According to the present embodiment, the device 24 possesses a fixed MAC address, and the wireless box also possesses a fixed MAC address.

According to the present embodiment, these distinct MAC addresses are used by the device 24 and by the wireless box 23 on the wireless medium. From the point of view of the wireless sub-network, two stations will appear to be present. The station incorporating the wireless box will emulate two stations: the one representing the wireless box, and the one representing the device 24. The station incorporating the wireless box associates twice with the access point, once with each of the MAC addresses.

In an IEEE 802.11 network, the MAC address is used for a number of purposes, among which:

- certain MAC sub-layer management Entity ("MLME") actions (e.g. association, authentication, power saving . . . ), the access point communicating with the stations and registering them using their MAC addresses;
- user control plane protocol (e.g. the MAC address is incorporated into MAC packet data units ("PDUs"), and a station detecting its MAC address in a destination address field of a packet has to generate an acknowledgment packet to the source device).

Figure 3:
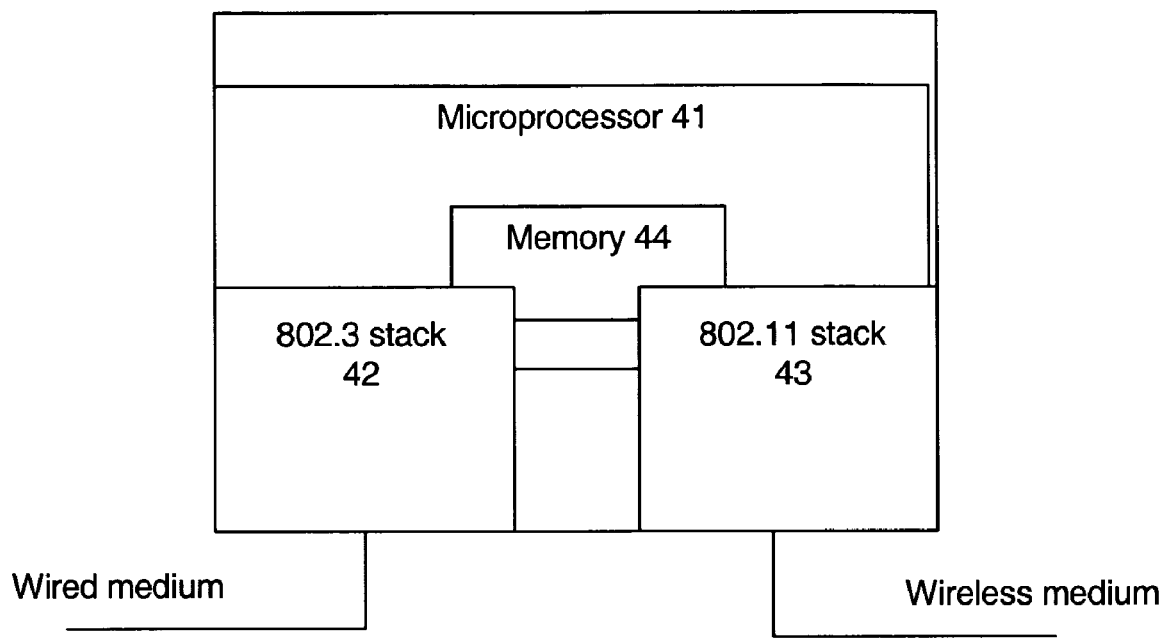
FIG. 3 is a block diagram of a wireless box device according to the present embodiment.

The wireless box 23, as illustrated by FIG. 3, comprises, among other circuitry, a microprocessor 41 for control of the wireless box and for implementing at least part of the protocols 42, 43 necessary to interface with each medium. The corresponding data is stored in a memory 44. Certain parts of the 802.11 protocols may be implemented using dedicated hardware, instead of software run by the microprocessor. Typically, the multiple association process and subsequent management of several parallel user data flows corresponding to the different MAC addresses will be handled by software, while dedicated hardware is in charge of detecting these MAC addresses in packets on the wireless network and of generating acknowledgment packets. The dedicated MAC hardware will be referred to as IEEE802.11MAC-HW, while the MAC software will be referred to as IEEE802.11MAC-SW. A TCP/IP/http stack places itself above the MAC layer.

Figure 4:
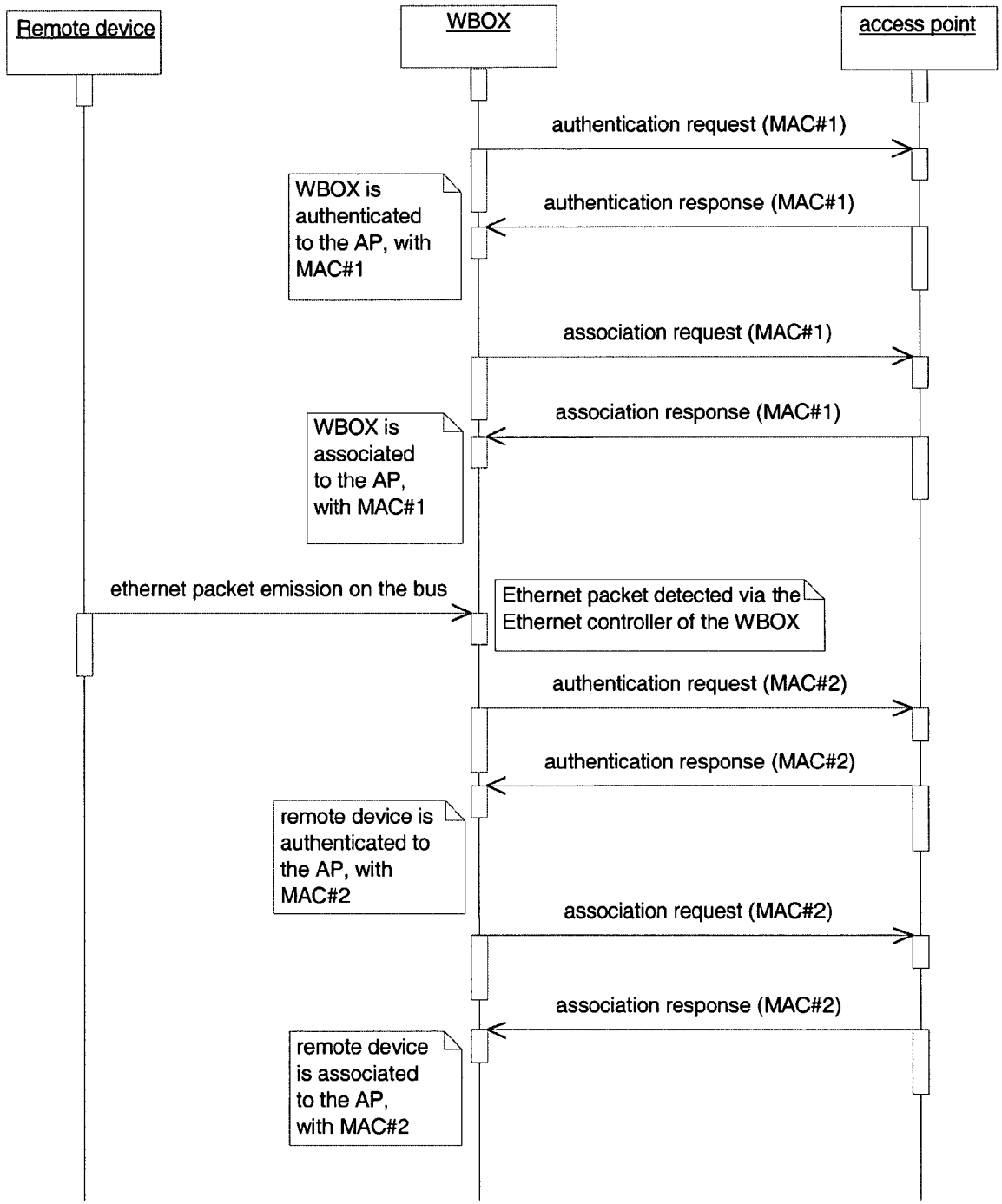
FIG. 4 is a message chart illustrating the obtaining of two MAC addresses from an access point by a device according to the present embodiment.

FIG. 4 is a chronological diagram of messages exchanged for the authentication and association of the wireless box 23 and the device 24 as stations with the access point 26. The same process would apply if more than one device were connected to the wireless box 23.

During its own set-up phase, the wireless box first registers itself with the access point, through the authentication and association process defined by the IEEE 802.11 standard. It uses its own MAC address for these exchanges.

The wireless box then starts the registration process for the device 24. The process can be triggered for example by the detection, by the wireless box, of an Ethernet packet on the bus 25, this packet containing a previously unknown MAC source address. The process as such is the same as for the registration of the wireless box itself. The wireless box programs its IEEE802.11-HW to filter packets with both MAC addresses.

The wireless box acts as if it represented two stations (or more, depending on the number of devices connected on a link). As a consequence, certain tasks it has to carry out are to be performed twice, while some tasks or resources may be common to both of the represented stations.

Figure 5:
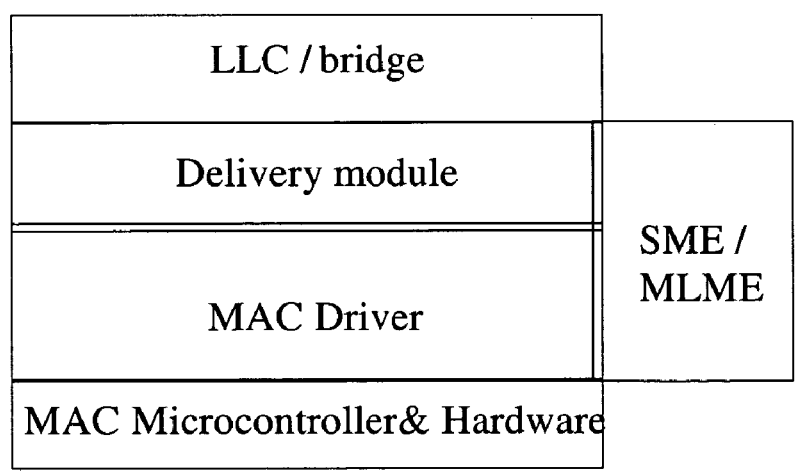
FIG. 5 is a diagram of the protocol layers of an IEEE 802.11 stack of the wireless box.

FIG. 5 is a diagram of the MAC layer architecture of the wireless box on the IEEE 802.11 interface.

On top of the stack resides a Logical Link Control layer that is in charge of the bridging functions of the wireless box. A MAC sublayer Management Entity (or 'MLME') provides layer management service interfaces through which layer management primitives may be invoked. A Delivery module component provides an interface to any component requiring the services of the IEEE 802.11 MAC layer. It performs the routing of frames, maintains a map of associated (BSS) and/or authenticated (IBSS) stations and manages logical FIFOs (one per associated station, should the wireless box act as access point) for delivery of frames to the MAC driver. The Delivery module is also in charge of building a 'traffic indication map' or 'TIM' which is used by the driver to generate beacons (also in case that the wireless box is an access point). Lastly, a Station Management Entity ('SME') is in charge of invoking MLME and Physical Layer Management Entity ('PLME'—not illustrated) primitives. This entity provides an interface to the Device Remote Configurator (not illustrated) when information is to be exchanged with the outside world, e.g. when a user configures the wireless box (the user can for example connect a personal computer to the network and configure certain parameters). The SME is responsible for gathering layer-dependent status data from various layer management entities as well as setting the value of layer-specific parameters ('MIB' attributes, where 'MIB' stands for Management Information Base). In other words, the SME is in charge of configuring the station.

According to the present embodiment, there is only one MIB for the wireless box and the device connected to it. This implies that the same encryption keys are used for both the wireless box and the device. The power management mode is also the same.

According to a variant embodiment of the invention, not all MIB parameters are common. For example, different encryption keys may be used.

A remote network manager (e.g. a personal computer running a web browser) may nevertheless see as many MIBs as there are MAC addresses. Configurable parameters and statistics are nevertheless the same. The wireless box, as a station, is remotely configurable from the device, from another station, or from a device located on the LAN to which the access point is connected.

As previously mentioned, authentication and association are performed for both the wireless box and the device 24. The same is true for the 'join' procedure (used for synchronization of a station with a BSS (Basic Service Set), as defined by IEEE 802.11).

Two modes may be used by stations to access the medium: the DCF mode (distributed coordination function mode) and the PCF mode (point coordination function). The DCF mode relies on a CSMA/CA mechanism (carrier sense multiple access/collision avoidance), and uses a random back-off period in case the medium is busy. The PCF mode uses a point coordinator for managing access to the medium.

The emission of packets in the DCF mode will first be described.

The IEEE802.11MAC-HW performs the same DCF algorithm or the device 24 and for the wireless box. Only one transmission FIFO is used for both the wireless box and the device 24 (although there is one FIFO for the DCF mode, and another one for the PCF mode). When it gains access to the medium, the IEEE802.11MAC-HW sends packets from the FIFO, without any condition on the source. While there is one transmission FIFO, different buffers are allocated to respectively the device 24 and the wireless box. The FIFO queue receives data from the buffers. The algorithm according to which this is done is not the object of the present invention.

The reception of packets in the DCF mode will now be described.

Upon detection/reception of a unicast packet with either the device's or the station's MAC address, the IEEE802.11MAC-HW acknowledges the packet. If the packet is a management packet, it is sent to the MLME part of the IEEE802.11MAC-SW. Else, if the packet is a data packet, it is sent to the IEEE802.11MAC-SW delivery module part. Unicast packets are the only acknowledged packets.

The IEEE802.11MAC-SW also maintains a list of multicast addresses of groups of which the wireless box is member. Received multicast packets addressed to one of those groups are forwarded to an appropriate application of the wireless box. The software of the wireless box cannot know—unless a proprietary mechanism is implemented—whether the device 24 is part of one or more multicast groups, and what the addresses of these groups might be. Consequently, it forwards all multicast packets to the device 24.

Broadcast packets are forwarded both to the wireless box and the device.

The transmission of packets in the PCF mode will now be described.

According to an option of the PCF mode, the point coordinator polls the stations one by one to allow them to send packets in response to the poll. This option is called 'contention-free poll' or 'cf-poll'. If the wireless box implements only one transmission FIFO for both itself and the device 24, then only one of the two may be cf-pollable. In this case, according to the present embodiment, priority is given to the device connected to the wireless box: the packets from the device will be placed in the FIFO, not those of the wireless box. If two (or more) buffers are available, then both the device and the wireless box can be cf-polled.

As has already been mentioned, more than one device may be connected to the wireless box. If only one PCF transmission buffer is implemented by the hardware, only one device can be cf-polled. According to the present embodiment, the first device that is associated with the access point is arbitrarily chosen as the cf-polled device. If several buffers are available, then these buffers are allocated in the order of association of the devices, again for arbitrary reasons.

According to the present embodiment, the wireless box can be configured to start an independent BSS ('IBSS'). If there is no device connected to the wireless box, the MAC address of the wireless box is used for sending beacons. If there is a connected device, then the MAC address of this device is used. If more than one device is connected, then, as an example, the MAC address of the first associated device is used.

Although the above embodiment uses mainly as an example the case where a single device is connected to the wireless box, the invention is not limited to this case and can be extended to any number of devices. Moreover, the invention is not limited to the connection of an IEEE 802.11 network with an Ethernet network. Other types of networks may be connected using the invention.

The invention claimed is:

1. Method for connecting a device not having wireless communication capability to a wireless network; characterized, at the level of a bridge device comprising means for interfacing with the wireless network comprising a wireless access point, by the steps of:
   detecting a connection between the device and the bridge device;
   determining a MAC address for the device and for the bridge device; and
   separately registering to the wireless access point, with their respective MAC addresses, the device and the bridge device as wireless devices on the wireless network, wherein the bridge device associates twice with the access point, once for each of said MAC addresses, so that said devices connected to said wireless network appear as wireless stations to the access point.

2. Method according to claim 1, further comprising the step of having the bridge device monitor traffic on the wireless network for the device.

3. Method according to claim 2, further comprising at least one of the following steps:
   forwarding all multicast packets detected on the wireless network from the bridge device to the connected device;
   forwarding all broadcast packets detected on the wireless network from the bridge device to the connected device;
   forwarding unicast packets on the wireless network having as destination address the MAC address of the connected device to that device.

4. Method according to claim 3, where the connection between the device and the bridge device is an Ethernet connection, and wherein the step of detecting the connection comprises monitoring packets on the Ethernet connection for detecting a previously unknown source address of an. Ethernet device.

5. Method according to claim 3, wherein the wireless network is of the IEEE 802.11 type, further comprising the step of maintaining a single management information base for both the bridge device and the connected device.

6. Method according to claim 2, where the connection between the device and the bridge device is an Ethernet connection, and wherein the step of detecting the connection comprises monitoring packets on the Ethernet connection for detecting a previously unknown source address of an Ethernet device.

7. Method according to claim 2, wherein the wireless network is of the IEEE 802.11 type, further comprising the step of maintaining a single management information base for both the bridge device and the connected device.

8. Method according to claim 1, further comprising the step of programming packet filters for packets having as destination address the MAC address of the device, and upon detection of such a packet, acknowledging receipt of said packet in place of the device.

9. Method according to claim 8, further comprising at least one of the following steps:
   forwarding all multicast packets detected on the wireless network from the bridge device to the connected device;
   forwarding all broadcast packets detected on the wireless network from the bridge device to the connected device;
   forwarding unicast packets on the wireless network having as destination address the MAC address of the connected device to that device.

10. Method according to claim 8, wherein the wireless network is of the IEEE 802.11 type, further comprising the step of maintaining a single management information base for both the bridge device and the connected device.

11. Method according to claim 1, where the connection between the device and the bridge device is an Ethernet connection, and wherein the step of detecting the connection comprises monitoring packets on the Ethernet connection for detecting a previously unknown source address of an Ethernet device.

12. Method according to claim 1, wherein the wireless network is of the IEEE 802.11 type, further comprising the step of maintaining a single management information base for both the bridge device and the connected device.

13. Bridge device comprising means for communication on a wireless network and for connection of a first device not having wireless communication capability to a wireless network comprising a wireless access point, said bridge device comprising:
   means for determining a MAC address of the first device and of the bridge device;

means for carrying out two separate device registrations, one for the bridge device, and one for the first device, for separately registering the first device and the bridge device to the wireless access point as wireless devices on the wireless network using their respective MAC addresses, wherein the bridge device associates twice with the access point, once for each of said MAC addresses so that said devices connected to said wireless network appear as wireless stations to the access point.

14. Method for connecting a device not having wireless communication capability to a wireless network; characterized, at the level of a bridge device adapted to interface with a wireless access point on the wireless network, by the steps of:
  detecting a connection between the device and the bridge device;
  determining a MAC address for the device and for the bridge device; and
  separately registering as wireless devices, with their respective MAC addresses, the device and the bridge device to the wireless access point on the wireless network, wherein the bridge device associates twice with the access point, once for each of said MAC addresses so that said devices connected to said wireless network appear as wireless stations to the access point.

15. Bridge device adapted for communication with a wireless access point on a wireless network and for connection of a first device not having wireless communication capability, said bridge device comprising;
  means for determining a MAC address of the first device and of the bridge device;
  means for carrying out two separate device registrations, one for the bridge device, and one for the first device, for separately registering the bridge device and the first device to the wireless access point as wireless devices on the wireless network using respective MAC addresses of the bridge device and the first device, wherein the bridge device associates twice with the access point once for each of said MAC addresses so that said devices connected to said wireless network appear as wireless stations to the access point.

* * * * *